March 5, 1963 S. J. HOMES 3,080,034
PIPE CRADLE AXLE ASSEMBLY
Filed Dec. 15, 1961
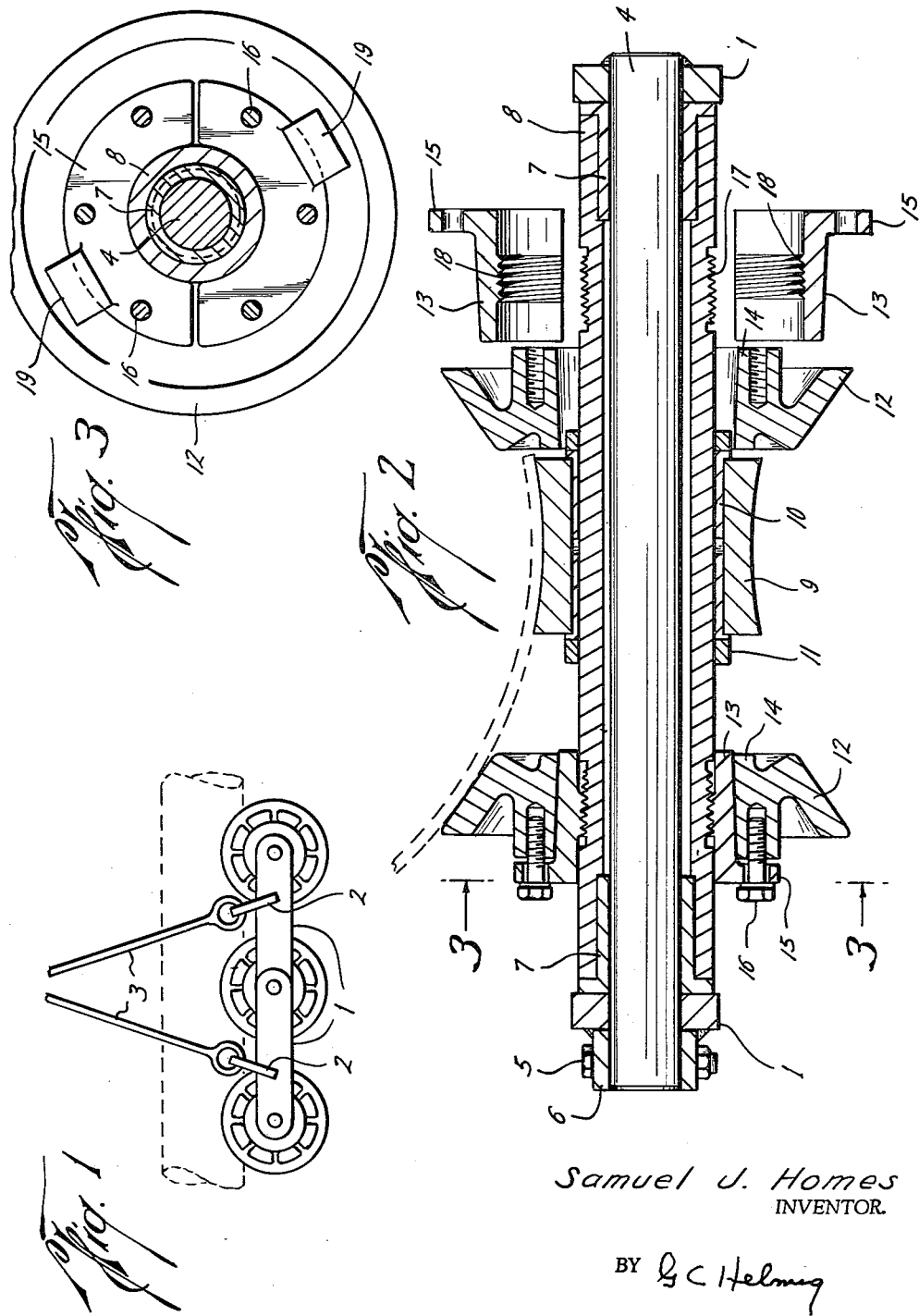
Samuel J. Homes
INVENTOR.
BY GC Helmig
ATTORNEY

United States Patent Office 3,080,034
Patented Mar. 5, 1963

3,080,034
PIPE CRADLE AXLE ASSEMBLY
Samuel J. Homes, Houston, Tex., assignor to Crutcher-Rolfs-Cummings, Inc., Houston, Tex., a corporation of Texas
Filed Dec. 15, 1961, Ser. No. 159,692
1 Claim. (Cl. 193—37)

This invention relates to pipe cradles of the kind which are suspended from moving vehicles during final working operations on and the lowering of cross-country pipe lines and more particularly to an improved pipe engaging roller mounting assembly.

An object of the invention is to provide a rugged roller wheel mounting involving a few simple parts of relatively low cost and enabling an easy and quick setting or change of wheel spacing to handle any of a wide range of different pipe diameters.

A further object is to provide an assembly of supporting shaft and multiple pipe bearing elements in which at least one bearing element is adjustable longitudinally of the shaft and comprises a wheel whose hub has a longitudinally tapered bore for reception of and wedging fitment to a similarly tapered bushing arranged for contractive action on the shaft, with sets of longitudinally spaced apart rib formations projected internally from the bushing and externally from the shaft for engagement by the ribs of one set with selected ribs of the other set to thereby locate the parts in any of several relative positions longitudinally of the shaft.

Another object of the invention is to provide the shaft and bushing with interlocking rib formations, as readily formed screw threads, whereby in the absence of a tight binding fit upon relative rotation of the bushing and shaft the resulting screw action will effect a relative longitudinal shift to an exact spacing distance between treads as called for by a given pipe diameter and whereupon the setting can readily be made secure.

Other objects and advantages will appear from the following specification taken with the accompanying drawing wherein FIG. 1 is a side elevation on a small scale of a three-axle cradle assembly with a dotted line illustration of a portion of the pipe supported in the cradle; FIG. 2 is a transverse section of one of the endmost axles with one wheel in disassembled relationship and FIG. 3 is an end elevation with parts in section on line 3—3 of FIG. 2.

The wheel mounting illustrated in the drawing has been particularly designed with reference to the handling of relatively large circular pipe and provision has been made for wheel adjustments to fit a range between twenty-two inch and thirty inch pipe diameters. In the case of a three-axle cradle, the opposite ends of the axles are supported in interpivoted side links 1—1 and centrally of each link is a suspension hook 2 for detachable connection with the lower end of a bail 3 which extends to some convenient distance above the region to be occupied by a pipe for joinder to a suspension cable located by an outrigger boom on a vehicle arranged to travel alongside of the pipe to be deposited on or into the ground.

As seen in FIG. 2, one of the side links 1 may have welded thereto an end of a transversely extending rod or shaft 4 whose opposite end is connected to the other side link 1. For convenience of assembly, the connection at the last mentioned end is preferably made detachable as by means of a retainer pin 5 which extends through aligned openings in the end of the shaft 4 and in a surrounding sleeve 6 whose inner end is welded to the adjoining link 1. Surrounding the shaft 4 and abutting the side links 1—1 are a pair of radial and thrust bearing sleeves 7—7 for rotatably mounting a hollow shaft 8 and which carries a set of three longitudinally spaced apart pipe engaging roller elements.

The central roll 9 has a concave tread to receive the lowermost portion of the round pipe wall and is therefore of smaller diameter than are the pair of side rolls or wheels which are spaced apart axially and outwardly from the center roll 9 and have inwardly tapered treads corresponding in size and shape but divergently related to one another. Each of the several axle assemblies in the cradle unit has a like set of rotatable rollers and all co-operate in providing a trough-like pipe supporting trackway.

To accommodate different rates of rotation between the differing diameter rollers, the smaller roll 9 is shown as having a rotatable bearing support by the hollow shaft 8. For that purpose, a bearing sleeve 10 is interposed between the roll 9 and shaft 8 and is longitudinally located between a pair of retainer rings 11 press fitted on the outside of the shaft 8.

The two side wheels preferably are identical in structure. Each includes a frusto-conical tread portion 12 and a tapered bushing 13 fitted to a similarly tapered axial bore in the wheel hub 14 and terminated outwardly of the assembly in a radial attachment flange 15 away from which the outer surface taper extends. The flange 15 overlies an adjacent end face of the hub 14 and is secured thereto by clamp studs 16. The exteriorly and longitudinally tapered bushing 13 is in the nature of a split contractible ring or more particularly is formed in two or more circular sections so that the tapered fit of the sections in the bore of the wheel hub 14, upon relative axial movement, will tend to produce inward crowding or wedging of the bushing sections 13 toward and into tight fitment with the peripheral surface of the hollow shaft 8. A two-part bushing is illustrated in the form of substantially semicircular halves, each embracing the rotatable axle shaft through slightly less than one hundred eighty degrees to afford clearance between the complemental bushing sections for accommodating their contraction or crowding toward one another. The bushing parts may have a degree of resiliency sufficient to permit a slight change in circularity under contractive force application.

A set of longitudinally spaced rib projections 17 is carried peripherally of the axle shaft 8 adjacent each wheel location and a set of similar ribs 18 project inwardly from each section of the bushing 13. The spaces or grooves between the ribs of each set mate with and receive the ribs of the other set. Preferably, the ribs in each instance are of screw thread or helical tooth formation and are so formed and shaped on the bushing halves that the halves are duplicates. As shown in the drawing, the number of tooth formations 17 on the shaft 8 exceeds or is about double the number of longitudinally spaced teeth 18 on the sectional bushing 13. This provides a range of relative longitudinal adjustment of the interfitted threads and controls relative positioning and spacing of the wheel assemblies.

When longitudinal spacing between the side wheels is to be reset, one but usually both wheels will be loosened or disassembled and resecured to the axle shaft after effecting a selected interengaging fitment of the bushing and shaft ribs 17 and 18. For such setting, the fastening studs 16 can be removed or backed off enough to allow the wheel hub 14 to be pushed and slipped inwardly away from close clamped bearing on the tapered bushing 13. Hammer lugs 19 are shown as being welded to the flanges 15 of each of the bushing sections so that these parts can be tapped in the event the tapered bearing surfaces and/or the thread bearing surfaces have become stuck to one another. Hammering and/or a prying force will spread and jar the parts loose. The segmental bushing 13 can be separated completely from the shaft 8 or simply loosened and rotated or threaded forwardly or backwardly as may be required, to the new setting. If completely separated, then the locating ribs 17 of the section again will be refitted to the axle shaft ribs 18 in a selected new relation. In either event, the wheel hub 14 thereafter is slid axially over the bushing until the tapered surfaces come into bearing and tend to crowd the bushing sections inwardly. A fine adjustment of screw threads may be effected prior to final securement and tightening of the bolts 16. Inward threading of the bolts 16 into the hub 14 and bolt head engagement with the bushing flanges 15 can be relied upon to draw the hub and split bushing toward one another for a tight taper fit. Contraction of the bushing parts against the hollow shaft 8 will secure the parts against relative displacement.

While the foregoing disclosure has detailed the structure of but one embodiment of the invention, it is to be understood that such modifications can be made as come within the scope of the appended claim.

What is claimed is:

In a pipe cradle subassembly, a supporting rod extending transversely of the pipe to be cradled, rod suspension means at both ends of the rod, a hollow shaft sleeved on the supporting rod and having rotatable bearing thereon, a central roller rotatably mounted on said hollow shaft for rotation independently of the hollow shaft and provided with a pipe engaging peripheral tread, a pair of wheel units fixedly mounted on and rotatable as a unit with said hollow shaft and in transversely spaced apart relation on opposite sides of the central roller, said wheel units being provided throughout their circumference with inwardly tapered treads of larger diameter than the roller tread, means mounting both wheel units for adjustment axially on the hollow shaft and each wheel unit comprising a hub having an inwardly tapered bore surrounding the hollow shaft, a split bushing fitted to the hub and inwardly tapered peripherally in correspondence with said tapered bore and slidably axially thereon into contractive engagement with the periphery of the hollow shaft, interengageable sets of axially spaced apart ribs on the hollow shaft and said split bushing for fixedly locating the bushing and shaft and a screw threaded fastening connection joining the wheel unit to the split bushing and exerting force axially on the wheel unit while the ribs hold the bushing against axial displacement and to thereby shift the wheel unit outwardly on the inwardly tapered periphery of the bushing for crowding the bushing between the wheel hub and the hollow shaft.

References Cited in the file of this patent
UNITED STATES PATENTS

| | | |
|---|---|---|
| 2,581,971 | Perrault | Jan. 8, 1952 |
| 2,678,856 | Chievitz | May 18, 1954 |
| 2,735,270 | Collins | Feb. 21, 1956 |
| 2,736,205 | Dunne | Feb. 28, 1956 |
| 2,745,291 | Michie | May 15, 1956 |